(12) United States Patent
Moussa et al.

(10) Patent No.: US 7,496,104 B2
(45) Date of Patent: Feb. 24, 2009

(54) ENHANCED ENCAPSULATION MECHANISM USING GRE PROTOCOL

(75) Inventors: Hachem Moussa, Plano, TX (US); Ricardo Serrano, Flower Mound, TX (US); Kory Keith, Garland, TX (US); Essam El-Beik, Dallas, TX (US); Ahmad Muhanna, Richardson, TX (US)

(73) Assignee: Nortel Networks Limited, St. Laurent, Quebec (CA)

( * ) Notice: Subject to any disclaimer, the term of this patent is extended or adjusted under 35 U.S.C. 154(b) by 714 days.

(21) Appl. No.: 10/917,852

(22) Filed: Aug. 13, 2004

(65) Prior Publication Data
US 2005/0089046 A1 Apr. 28, 2005

Related U.S. Application Data

(60) Provisional application No. 60/560,807, filed on Apr. 8, 2004, provisional application No. 60/495,280, filed on Aug. 15, 2003.

(51) Int. Cl.
*H04L 12/56* (2006.01)

(52) U.S. Cl. .................. 370/401; 370/231; 370/395.52

(58) Field of Classification Search ......... 455/405–408; 370/465–467, 395.52, 474; 379/114.03, 379/114.1, 114.21–115.02, 121.03
See application file for complete search history.

(56) References Cited

U.S. PATENT DOCUMENTS

| | | | | |
|---|---|---|---|---|
| 6,061,650 A * | 5/2000 | Malkin et al. | | 704/228 |
| 6,356,887 B1 * | 3/2002 | Berenson et al. | | 707/2 |
| 6,826,396 B1 * | 11/2004 | Yasue et al. | | 455/412.1 |
| 6,829,473 B2 * | 12/2004 | Raman et al. | | 455/406 |
| 7,068,995 B1 * | 6/2006 | Geddes et al. | | 455/406 |
| 7,130,612 B1 * | 10/2006 | Blewett et al. | | 455/406 |
| 2002/0001295 A1 * | 1/2002 | Park | | 370/338 |
| 2002/0078028 A1 * | 6/2002 | Lisanke | | 707/1 |
| 2002/0094831 A1 * | 7/2002 | Maggenti et al. | | 455/518 |
| 2002/0102999 A1 * | 8/2002 | Maggenti et al. | | 455/518 |
| 2002/0183080 A1 * | 12/2002 | Poor et al. | | 455/466 |
| 2003/0050933 A1 * | 3/2003 | DeSalvo | | 707/102 |
| 2003/0104801 A1 * | 6/2003 | Koulakiotis et al. | | 455/406 |
| 2003/0157926 A1 * | 8/2003 | Ala-Laurila et al. | | 455/406 |
| 2003/0207686 A1 * | 11/2003 | Ramanna et al. | | 455/435.1 |
| 2003/0233329 A1 * | 12/2003 | Laraki et al. | | 705/52 |
| 2004/0017905 A1 * | 1/2004 | Warrier et al. | | 379/114.15 |

(Continued)

*Primary Examiner*—Hassan Kizou
*Assistant Examiner*—Mounir Moutaouakil
(74) *Attorney, Agent, or Firm*—Garlick Harrison & Markison; James A. Harrison; Kevin L. Smith

(57) ABSTRACT

The methods of the present invention enable wireless gateway nodes to support mobile node services, such as content based billing, when a data treatment server is present in the system. Using one of a defined Content Flow Label (CFL), an Application Program Interface (API), and a compression protocol header, the present invention provides content based billing by exchanging content and byte count information with the data treatment server. In one embodiment, a new compression protocol header type is defined. In a second embodiment, a content flow label with a byte count field is inserted in a Generic Routing Encapsulation (GRE) header. In an alternate embodiment, the wireless gateway node implements an API to transfer the content flow label and byte count information over a signaling link. In yet another embodiment, the data treatment server performs the content based billing and similar mobile node services.

12 Claims, 17 Drawing Sheets

API downlink

U.S. PATENT DOCUMENTS

| | | | |
|---|---|---|---|
| 2004/0018829 A1* | 1/2004 | Raman et al. | 455/406 |
| 2004/0106393 A1* | 6/2004 | Chowdhury et al. | 455/406 |
| 2004/0165530 A1* | 8/2004 | Bedekar et al. | 370/235 |
| 2004/0215753 A1* | 10/2004 | Chan et al. | 709/223 |
| 2004/0266391 A1* | 12/2004 | Hafren | 455/405 |
| 2004/0266394 A1* | 12/2004 | Mizell et al. | 455/408 |
| 2005/0083903 A1* | 4/2005 | Yasue et al. | 370/349 |
| 2005/0094647 A1* | 5/2005 | Hata et al. | 370/395.52 |
| 2005/0117595 A1* | 6/2005 | El-Beik et al. | 370/401 |
| 2005/0175006 A1* | 8/2005 | Miyazaki et al. | 370/389 |
| 2005/0192035 A1* | 9/2005 | Jiang | 455/461 |
| 2005/0249194 A1* | 11/2005 | Sahaya et al. | 370/352 |
| 2006/0003754 A1* | 1/2006 | Robison et al. | 455/414.3 |

* cited by examiner

Communication network

API uplink

API downlink tunnel uplink tunnel downlink uplink signal graph downlink signal graph compression protocol header

ENHANCED ENCAPSULATION MECHANISM USING GRE PROTOCOL

CROSS REFERENCE TO RELATED PATENTS

This application claims priority to U.S. Provisional Patent Application Ser. No. 60/560,807, filed Apr. 8, 2004, expired, and U.S. Provisional Patent Application Ser. No. 60/495,280, filed Aug. 15, 2003, expired, which are hereby incorporated herein by reference for all purposes.

BACKGROUND OF THE INVENTION

1. Technical Field of the Invention

This invention relates generally to cellular wireless communication systems and, more particularly, to enhanced protocols and services provided therein.

2. Description of Related Art

A General Packet Radio Service (GPRS) is a non-voice value added service that allows information to be sent and received across a mobile telephone network. It supplements, or rides on top of, today's circuit switched data and short message service networks. The theoretical maximum speed of GPRS includes speeds of up to approximately 171.2 kilobits per second (kbps). This maximum speed is achievable in GPRS systems using all eight timeslots at the same time in a Time Division Multiple Access (TDMA) context. This speed is about three times as fast as data transmission speeds possible over today's fixed telecommunication networks and ten times as fast as current circuit switched data services on Global System for Mobile Communications (GSM) standard TDMA networks. Thus, GPRS systems are advantageous in that they require less system resources to transmit a fixed amount of data in comparison to using a traditional circuit switched approach. By allowing information to be transmitted more quickly, immediately, and efficiently across the mobile network, GPRS may well be a relatively less costly mobile data service compared to Short Message Service (SMS) and circuit switched data services.

GPRS also facilitates instant connections in which information can be sent or received immediately as the need arises, subject to radio coverage. No dial-up modem connection is necessary. GPRS, similar to some broadband connections for personal computers, often is referred to as being "always connected". Thus, another one of the advantages of GPRS is that data may be transmitted immediately, whenever the need arises. In contrast to circuit switched data networks in which a connection must be established to transmit a data packet or data file, GPRS operation is extremely efficient in those situations in which a small amount of data is to be sent. As the emphasis of many designs today are to create wireless computer networks, and to connect data devices including personal computers to wireless transceivers and mobile terminals, such a system that provides instantaneous response is very important for time critical applications and, more generally, for the implementation of wireless computer networks. For example, a remote credit card authorization system implemented in a wireless network can be greatly improved if it is unnecessary for the customer to wait the amount of time that is required to establish a connection.

As suggested before, GPRS involves overlaying a packet based air interface on an existing circuit switched wireless network. For example, the circuit switched wireless network may comprise a GSM network. Accordingly, the user is given an option to utilize a packet based data service. In order to overlay a packet based air interface over a circuit switched network, the GPRS standard defines new infrastructure nodes to minimize the impact to existing networks in terms of hardware and software. For example, a Gateway GPRS Service Node (GGSN) and a Serving GPRS Support Node (SGSN) are two such infrastructure nodes.

One advantage of GPRS is that the packet switching that results from the infrastructure nodes allows the use of GPRS radio resources only when users actually are sending or receiving data. Unlike traditional circuit switched voice networks, a connection is not continuously reserved for a user for the intermittent transmission of data. This efficient use of scarce radio resources means that larger numbers of GPRS users can share the same bandwidth and be served from a single base station or cell. The actual number of users that may use the system at one time depends, of course, on the amount of data being transferred.

Packet domain utilized in GPRS and a Universal Mobile Telecommunications System (UMTS) uses a packet-mode technique to transfer high-speed and low-speed data and signaling in an efficient manner and generally optimizes network and radio resources. Strict separation between the radio subsystems and network subsystems is maintained thereby allowing a network subsystem to be reused with other radio technologies. A common core network provides packet switched services and supports differing quality of service (QoS) levels to allow efficient transfer of non-continuous bit rate traffic (for example, bursty data transfers).

The UMTS network also provides connectionless services. Moreover, GPRS and UMTS support push services. A push service is the delivery of data or multimedia information from a network node to user equipment for the purpose of providing subscriber-based information from the network. A push service also can include activating a Packet Data Protocol (PDP) context, if necessary. Examples of delivery networks that offer push services include, as stated, the GPRS network, but can also include other equipment, such as a Session Initiation Protocol (SIP) proxy, a push proxy or an SMS service center. Push services are becoming popular because of their ability to deliver advertisements, as well as subscriber ordered content services such as streaming media, web pages, traffic conditions, sports scores, stock quotes, etc. New services and features being offered require that push capabilities be implemented to enable external Internet protocol networks to deliver data to third generation (3G) wireless terminals in the paging system (PS) domain.

Some of these new services and features are provided by content service providers that charge for the content accessed and applications used. Traditionally, Internet usage has been based on time "on-line" due to the reliance on the original Public Switched Telephone Network (PSTN) that maintained a connected switched circuit regardless of the amount of data transiting the switched circuit. Providing content based billing motivates IP network service providers to charge for content delivered to the mobile subscriber. This is typically accomplished by a wireless gateway node inspecting the payload of data packets to determine content and byte count.

Data treatment servers are used in wireless communication networks to optimize or compress the payload of data packets to reduce the amount of data transmitted over a wireless communication link. This treatment of the payload renders the payload unreadable by the wireless gateway node and, therefore, prevents payload inspection.

Data packet content based billing in a GPRS or UMTS thus typically requires a wireless gateway node, such as a GGSN, to be capable of inspecting content of data being transmitted through the gateway node. When data is conducted through the gateway node in a proprietary or treated format, however, the payload is unreadable and the gateway device is unable to perform content based billing and is therefore unable to provide content based services. The presence of a data treatment server that treats (optimizes or compresses) the data packet payload often, therefore, defeats the ability for data packet inspection. There is, therefore, a need for an apparatus and a method for providing mobile node services such as content based billing in a wireless communication network with data treatment servers.

BRIEF SUMMARY OF THE INVENTION

The methods and apparatus of the present invention enables GPRS wireless gateway nodes (GGSNs) to support mobile node services such as content based billing and data packet routing. Using one of a defined Content Flow Label (CFL), an Application Program Interface (API), and a compression protocol header, the present invention provides for content based billing by exchanging content and byte count information with the data treatment server. Thus, the presence of a data treatment server does not inhibit the wireless gateway node from providing mobile node services. In many of the described embodiments, a content flow label is identified as a label for carrying identity of content flow. It should be understood that the invention is not specifically limited to the described embodiment and that the invention generally includes the transmission of any type of identifier that may be used to determine characteristics of a treated content flow through a gateway devices, for example, to or from a data treatment server.

In one embodiment, a new compression protocol header type is defined. The new compression protocol header contains, as a minimum, a billing ID that identifies the content(s) of the payload and the treated byte count for each content type. For downlink data packets, the data treatment server supplies the treated byte count for each content type identified by the wireless gateway node. For uplink data packets, the data treatment server supplies the treated byte counts and the wireless gateway node inspects the uplink untreated data packet payload for a corresponding content type. For a data packet downlink having an untreated payload, the wireless gateway node inspects the payload for content then inserts a content flow label in a header of the data packet to classify and identify the untreated payload then routes the data packet with the untreated payload to a data treatment server wherein the data treatment server converts the untreated payload to a treated payload. The data packet including the treated payload is returned from the data treatment server wherein the header includes the content flow label and a corresponding byte count of the treated payload. For an uplink data packet that includes a treated payload from a wireless node, the wireless gateway node inserts the content flow label in a header of the data packet routed to the data treatment server. The data treatment server converts the treated payload to an untreated payload and returns the content flow label and the byte count for the treated payload.

In a second embodiment, a content flow label with a byte count field is inserted in the header of a Generic Routing Encapsulation (GRE) header. The content flow label is used to identify content types and the byte count field defines the number of treated bytes transmitted over a wireless link. In an alternate embodiment, the wireless gateway node implements an API to transfer the content flow label and byte count information over a signaling link. In yet another embodiment, the data treatment server performs the content based billing and similar mobile node services.

The above-referenced description of the summary of the invention captures some, but not all, of the various aspects of the present invention. The claims are directed to some of the various other embodiments of the subject matter towards which the present invention is directed. In addition, other aspects, advantages and novel features of the invention will become apparent from the following detailed description of the invention when considered in conjunction with the accompanying drawings.

DETAILED DESCRIPTION OF THE INVENTION

Figure 1:
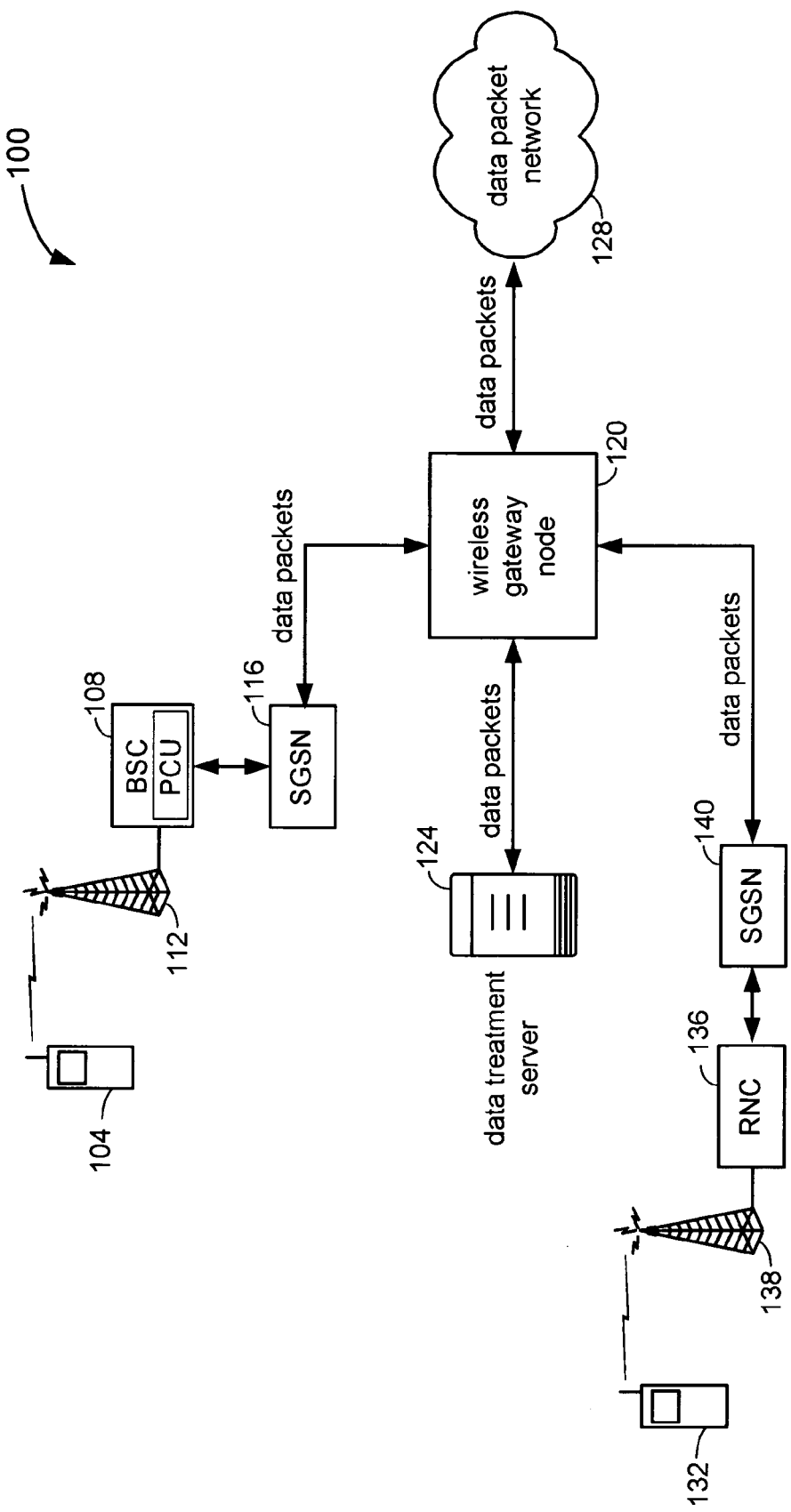
FIG. 1 is functional block diagram of a communication network formed in accordance with an embodiment of the present invention.

FIG. 1 is functional block diagram of a communication network formed in accordance with an embodiment of the present invention. The communication network shown generally at 100 includes a mobile node 104 that communicates within a GPRS network. Mobile node 104 is a GPRS-capable and voice-capable mobile terminal that communicates with the GPRS network by way of a Base Station Controller (BSC) 108 and a tower 112. The BSC 108 includes a Packet Control Unit (PCU) that separates the packet data for transmission to a Serving GPRS Support Node (SGSN) 116 by way of a Gb interface. Although shown as part of BSC 108, the PCU could be formed as a separate unit. The GPRS network includes SGSN 116 that is operatively coupled to a wireless gateway node 120. Additionally, a data treatment server 124 is operably coupled to wireless gateway node 120 to provide data treatment services to mobile node subscribers. The SGSN, such as SGSN 116, is for communicating with a mobile node to initiate a data session or connection through a wireless data packet network and providing data packet routing between the mobile node and wireless gateway node 120. The wireless gateway node 120 provides a gateway, as its name suggests, from the wireless data packet network to a data packet network 128. Thus, as may be seen, wireless gateway node 120 is operatively coupled to data packet network 128.

A mobile terminal 132 communicates, by way of a Radio Network Controller (RNC) 136 and a tower 138, with an SGSN 140 within a UMTS network. The SGSN 140 connects to wireless gateway node 120 to access data packet network 128. Generally, the SGSN monitors an individual mobile node location and performs related functions, such as access control and mobility management. The SGSN connects to the GSM base station through the high-speed frame relay Gb interface and/or to the UMTS RNC through an Iu interface. The SGSN is functionally equivalent to a Mobile Switching Center (MSC) in a voice-only GSM network. Wireless gateway node 120 provides interworking with external packet switched networks that are connected to SGSNs via an IP-based packet domain backbone network. Generally, the wireless gateway node 120 provides an interface between the GPRS/UMTS networks and an external packet switched network such as the Internet.

To facilitate higher bandwidth, data packets transferred between the mobile node and external data packets networks may be compressed or optimized by proprietary treatment software to reduce the number of bytes of data transmitted over the wireless link. Data treatment server 124, comprising one of a Traffic Protocol Optimizer (TPO) and a load balancer, treats the payload of downlink data packets before the data packets are routed to the RNC/BSC. Similarly, uplink data packets transmitted by a mobile node having a treated payload are routed by wireless gateway node 120 to data treatment server 124 which removes the treatment before returning the untreated data packet to wireless gateway node 120 for routing to data packet network 128.

For wireless gateway nodes to perform mobile node services such as content based billing, pre-paid wireless, firewall services, and content based routing, the wireless gateway node must be able to inspect the data packets for content. Data treatment of the data packet payload makes it impossible for the wireless gateway node to interpret the compressed or optimized payload.

As will be described in greater detail below, methods of the present invention provide mechanisms to send and receive payload content and transmitted treated byte count information between the wireless gateway node and the data treatment server.

Figure 2:
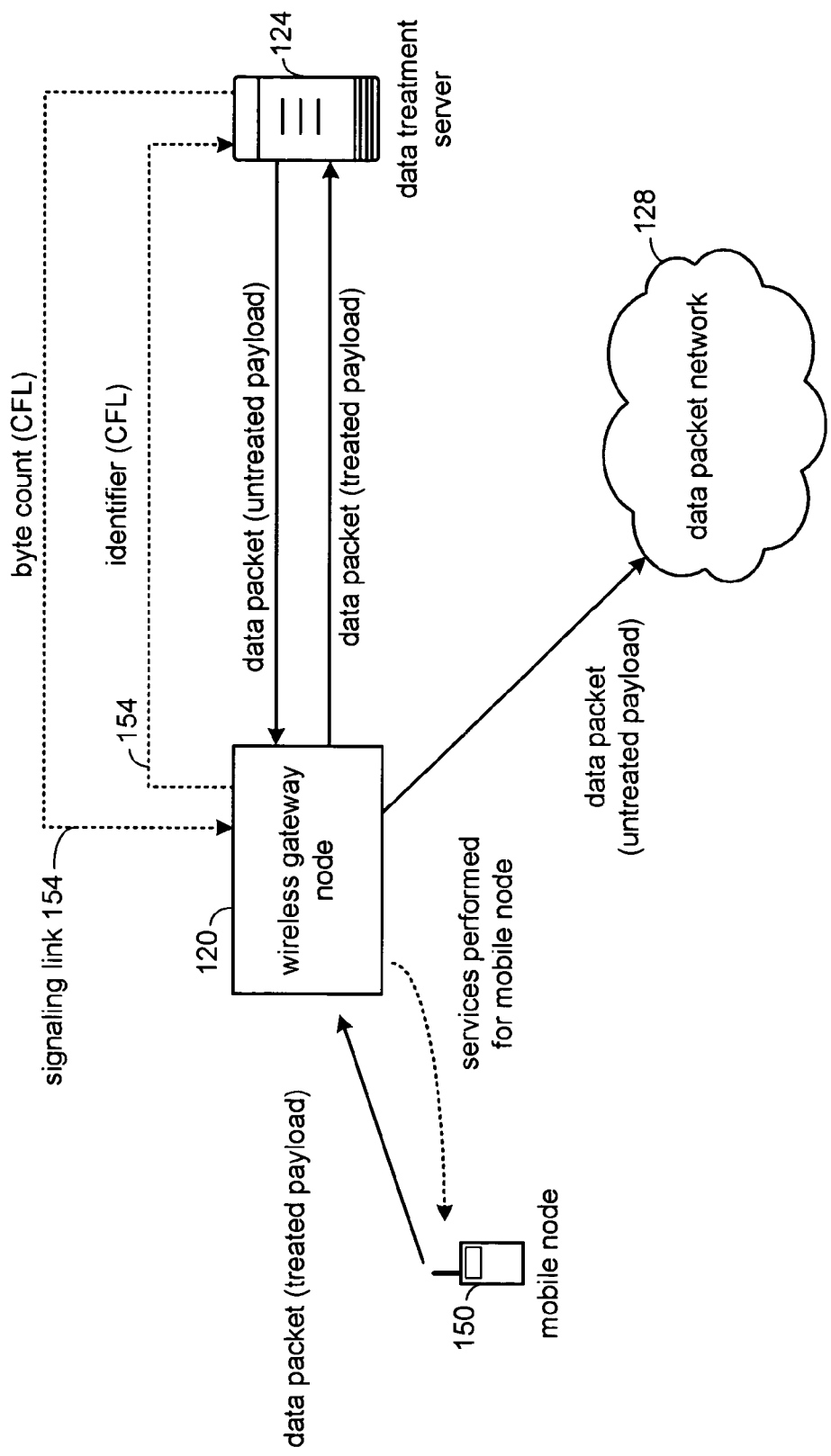
FIG. 2 is a schematic block diagram of an API uplink embodiment of the present invention.

FIG. 2 is a schematic block diagram of an API uplink embodiment of the present invention. An uplink is defined as a transfer of a data packet from a mobile node to a data packet network. In the example of FIG. 2, mobile node 150 is transferring a data packet containing a treated payload to data packet network 128. Wireless gateway node 120 may be one of a GGSN or a media gateway and, in the example of FIG. 2, represents all network support elements such as RNCs, BSCs and SGSNs. The treated payload contains data that has been compressed or optimized by a proprietary software algorithm to reduce the amount of data transmitted over a wireless link.

Wireless gateway node 120 routes the data packet, including the untreated payload, to a destination according to a destination address in the data packet header. In order to provide mobile node services, such as content based billing, wireless gateway node 120 must inspect the payload to determine the contents thereof. Because of the treated payload, wireless gateway node 120 is unable to inspect the contents of the treated payload and is therefore unable to perform mobile node services as discussed above. Wireless gateway node 120 routes the data packet with the treated payload to data treatment server 124 where the treated payload is un-optimized to create an untreated payload and is then routed back to wireless gateway node 120. Wireless gateway node 120 inspects the untreated payload for content before routing the data packet with the untreated payload to data packet network 128. For each content type in the untreated payload, wireless gateway node 120 creates a content flow label. Content types may be based on information identified by any type of ID or label in layers 3 through 7 of the OSI stack. For example, the content types may be identified as one of a Uniform Resource Locator (URL) for any packet data network including, for example, HTTP or Wireless Application Protocol (WAP), or even a phone number.

An API is a series of software functions for utilizing operating system features. The API provides a common interface for higher level software programs to access these functions. In the example of FIG. 2, wireless gateway node 120 executes an API to transfer each created CFL to data treatment server 124 over signaling link 154. The signaling link 154 may be over one of an SS7 network, an ATM network, or an IP network. Data treatment server 124 returns a byte count corresponding to each CFL over signaling link 158 to wireless gateway node 120. The returned byte count for each CFL type represent the number of bytes transmitted over the wireless link between mobile node 150 and wireless gateway node 120. Thus, wireless gateway node 120 provides services for mobile node 150 based on transmitted treated payload byte counts and the content of the treated payload.

Figure 3:
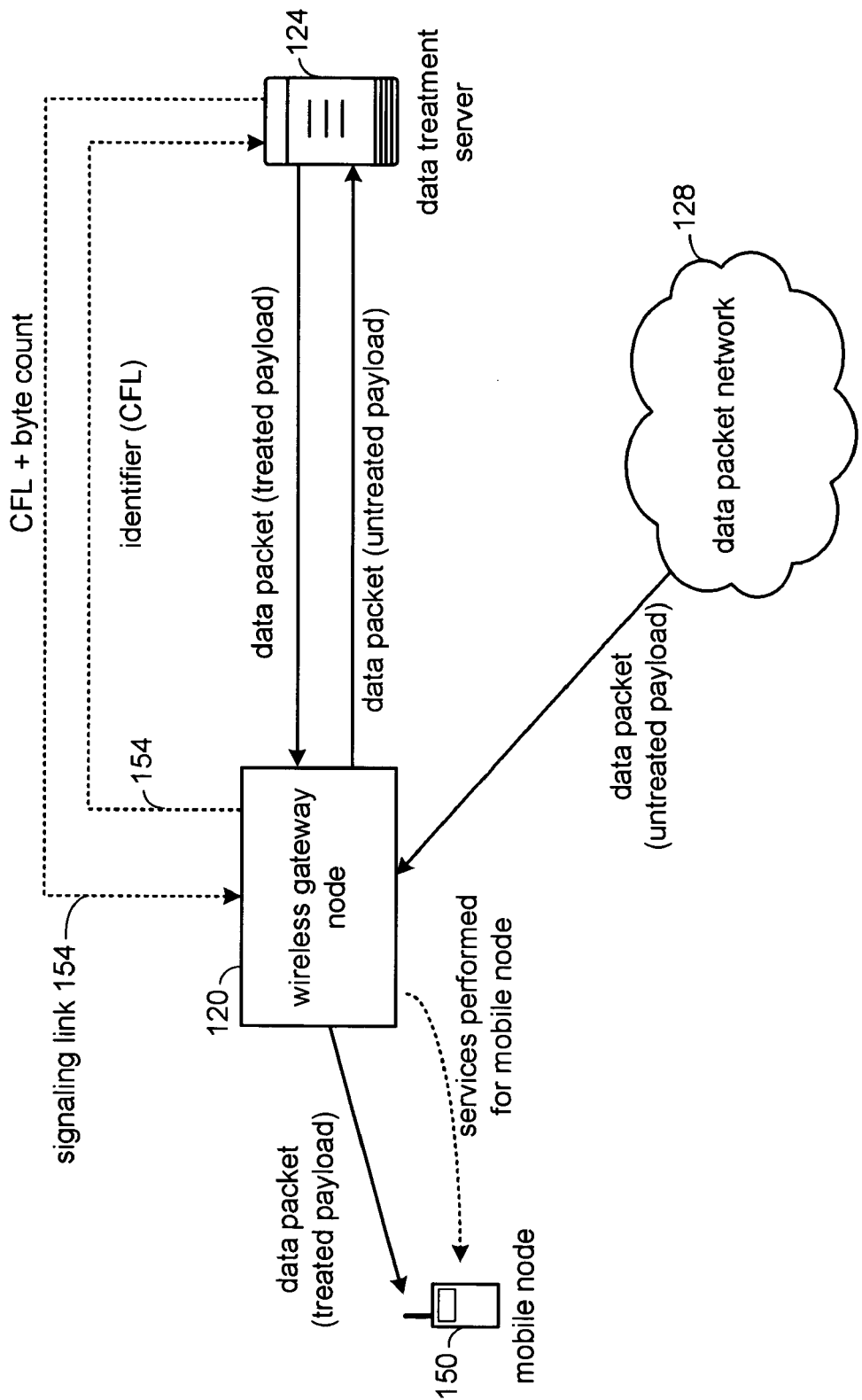
FIG. 3 is a schematic block diagram of an API downlink embodiment of the present invention.

FIG. 3 is a schematic block diagram of an API downlink embodiment of the present invention. A downlink is defined as a transfer of a data packet from a data packet network to a mobile node. In the example of FIG. 3, wireless gateway node 120 receives a data packet containing an untreated payload from data packet network 128. Wireless gateway node 120 may be one of a GGSN or a media gateway and, in the example of FIG. 3, represents all network support elements such as RNCs, BSCs and SGSNs.

Wireless gateway node 120 functions as a routing device to route a data packet to a destination based on a destination address in the data packet header. In order to provide mobile node services, such as content based billing, wireless gateway node 120 inspects the untreated payload to determine the contents thereof. The services are based on the transmitted byte count for each content type.

Wireless gateway node 120 inspects the untreated payload for content before routing the data packet with the untreated payload to data treatment server 124. For each content type in the untreated payload, wireless gateway node 120 creates a CFL. Content types may be based on one of a URL, a phone number, or a WAP. Wireless gateway node 120 routes the data packet with the untreated payload to data treatment server 124 where the untreated payload is optimized to create a treated payload. The treated payload contains data that has been compressed or optimized by a proprietary software algorithm to reduce the amount of data transmitted over a wireless link. The data packet including the treated payload is routed back to wireless gateway node 120 which forwards the data packet to mobile node 150.

In order to associate a transmitted treated byte count with each CFL, wireless gateway node 120 executes an API to transfer each created CFL to data treatment server 124 over signaling link 154. The signaling link 154 may be over one of an SS7 network, an ATM network, or an IP network. Data treatment server 124 returns, by way of signaling link 154, a byte count corresponding to each CFL to wireless gateway node 120. The returned byte count for each CFL type represent the number of bytes transmitted over the wireless link between mobile node 150 and wireless gateway node 120. Thus, wireless gateway node 120 provides services for mobile node 150 based on transmitted treated payload byte counts and the content of the treated payload.

Figure 4:
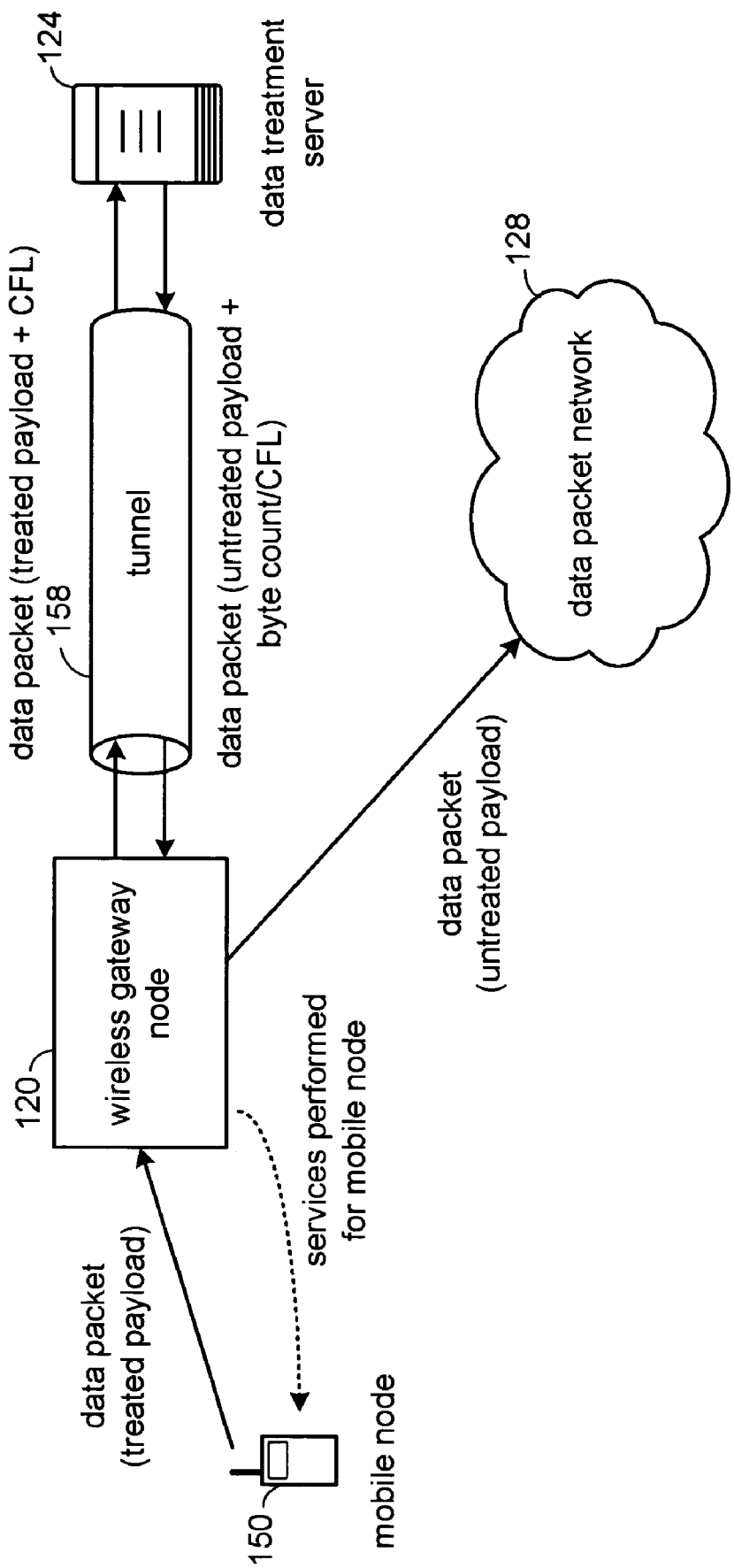
FIG. 4 is a schematic block diagram of a tunnel uplink embodiment of the present invention.

FIG. 4 is a schematic block diagram of a tunnel uplink embodiment of the present invention. An uplink is defined as a transfer of a data packet from a mobile node to a data packet network. In the example of FIG. 4, mobile node 150 is transferring a data packet containing a treated payload to data packet network 128. Wireless gateway node 120 may be one of a GGSN or a media gateway and, in the example of FIG. 4, represents all network support elements such as RNCs, BSCs and SGSNs. The treated payload contains data that has been compressed or optimized by a proprietary software algorithm to reduce the amount of data transmitted over a wireless link.

Wireless gateway node 120 routes the data packet including the untreated payload to a destination according to a destination address in the data packet header. In order to provide mobile node services, such as content based billing, wireless gateway node 120 must inspect the payload to determine the contents thereof. Because of the treated payload, wireless gateway node 120 is unable to inspect the contents of the treated payload and is therefore unable to perform services, such as content based billing. Wireless gateway node 120 creates tunnel 158 by encapsulating the data packet by adding a content flow label field to the data packet header. Wireless gateway node 120 routes the encapsulated data packet to data treatment server 124 where the treated payload is un-optimized to create an untreated payload. Data treatment server 124 inserts a corresponding byte count in the encapsulated data packet for each CFL then routes the data packet back to wireless gateway node 120.

Wireless gateway node 120 inspects and classifies the untreated payload for content before routing the data packet with the untreated payload to data packet network 128. Content types may be based on one of a URL, a phone number, or a WAP. Thereafter, wireless gateway node 120 performs services for mobile node 150 based on the transmitted treated payload byte counts and the content of the treated payload.

Figure 5:
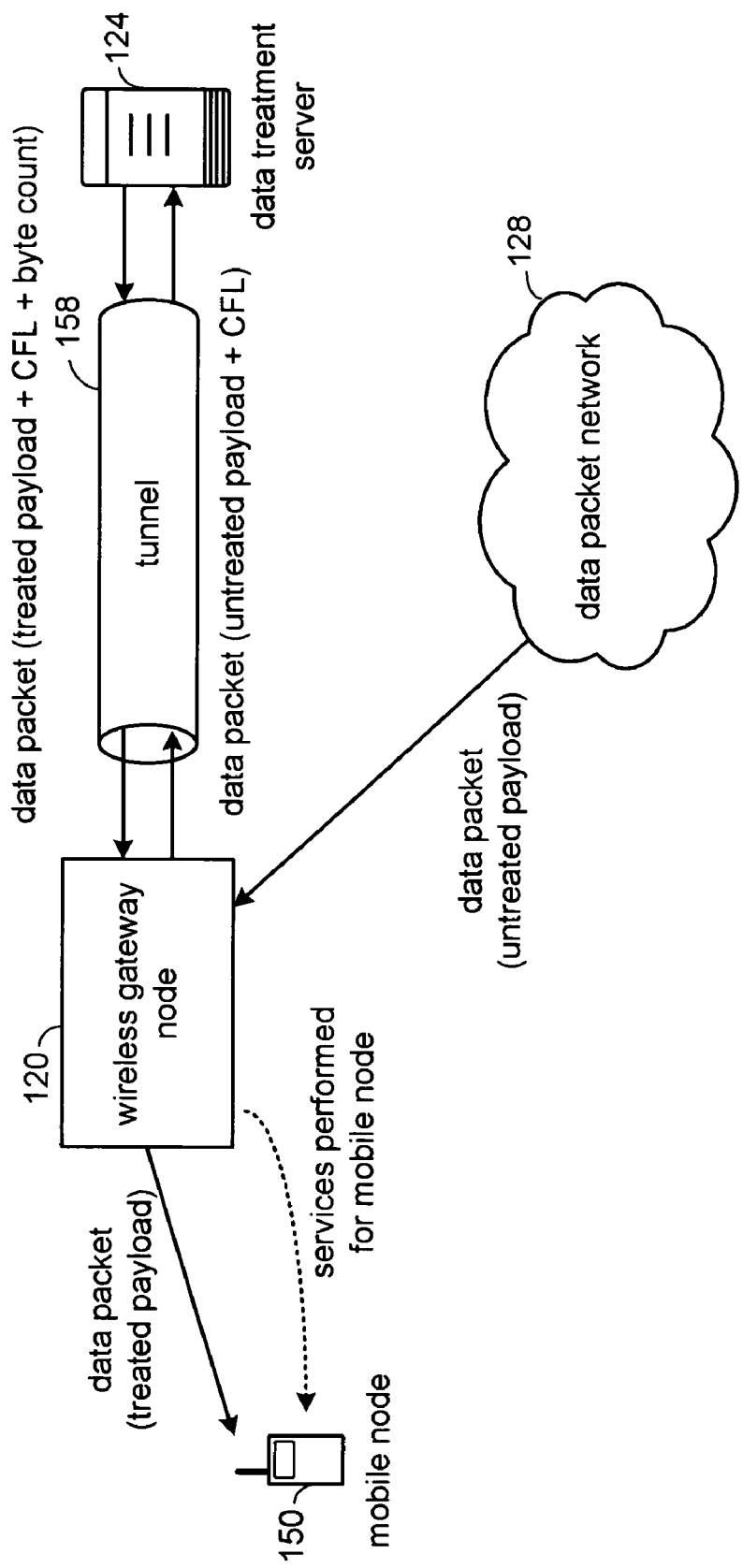
FIG. 5 is a schematic block diagram of a tunnel downlink embodiment of the present invention.

FIG. 5 is a schematic block diagram of a tunnel downlink embodiment of the present invention. A downlink is defined as a transfer of a data packet from a data packet network to a mobile node. In the example of FIG. 5, the wireless gateway node 120 is receiving a data packet containing an untreated payload from data packet network 128 where it is forwarded to data treatment server 124. Wireless gateway node 120 may be one of a GGSN or a media gateway and, in the example of FIG. 5, represents all network support elements such as RNCs, BSCs and SGSNs.

Wireless gateway node 120 receives the data packet with the untreated payload from data packet network 128. In order to provide mobile node services, such as content based billing, wireless gateway node 120 must inspect the payload to determine the contents thereof. Wireless gateway node 120 inspects and classifies the untreated payload for content before routing the data packet with the untreated payload to the data treatment server 124. Content types may be based on one of a URL, a phone number, or a WAP. Wireless gateway node 120 creates tunnel 158 by encapsulating the data packet and by adding a CFL field and a byte count field to the data packet header. The CFL is an identifier the wireless gateway node 120 uses to identify the rate bucket against which the mobile node services will be charged. Wireless gateway node 120 then routes the encapsulated data packet with the untreated payload to data treatment server 124 where the untreated payload is optimized to create a treated payload. For each CFL in the data packet header, data treatment server 124 inserts a corresponding byte count in the byte count field representing the treated or optimized byte count for each CFL type in the treated payload. The treated byte count corresponds to the byte count that will be transmitted over the wireless link to the mobile node. Data treatment server 124 routes the data packet back to wireless gateway node 120. Wireless gateway node 120 removes the encapsulation and forwards the data packet with the treated payload to mobile node 150. Thereafter, wireless gateway node 120 performs services for mobile node 150 based on the transmitted treated payload byte counts and the content of the treated payload.

Figure 6:
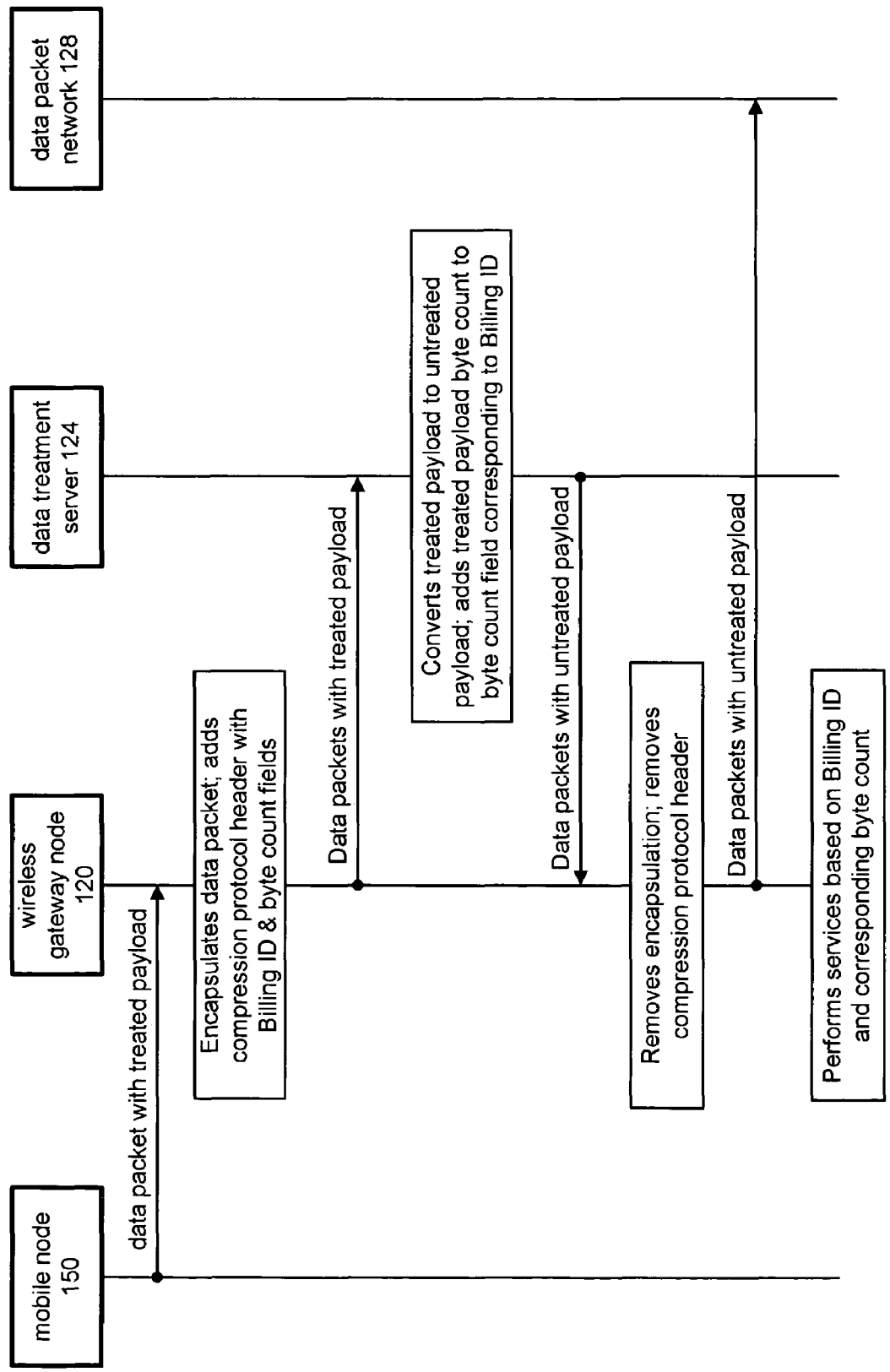
FIG. 6 is an uplink signal graph according to one embodiment of the present invention.

FIG. 6 is an uplink signal graph according to one embodiment of the present invention. Mobile node 150 transmits a data packet with a treated payload to wireless gateway node 120. Wireless gateway node 120 encapsulates the data packet and the treated payload by adding a compression protocol header having billing ID and byte count fields, among others. Wireless gateway node 120 routes the data packets with the treated payload to data treatment server 124. Data treatment server 124 converts the treated payload to an untreated payload and adds the treated payload byte count to the byte count field corresponding to each billing ID. Data treatment server 124 then routes the data packets with the untreated payload back to wireless gateway node 120. Wireless gateway node 120 removes the compression protocol header and removes the encapsulation and further inspects and classifies the payload for content. The inspected content of the untreated payload is correlated with the billing ID and byte count fields. The data packet with the untreated payload is then routed to data packet network 128. Thereafter, wireless gateway node 120 performs mobile node services based on the billing ID and the corresponding byte counts.

Figure 7:
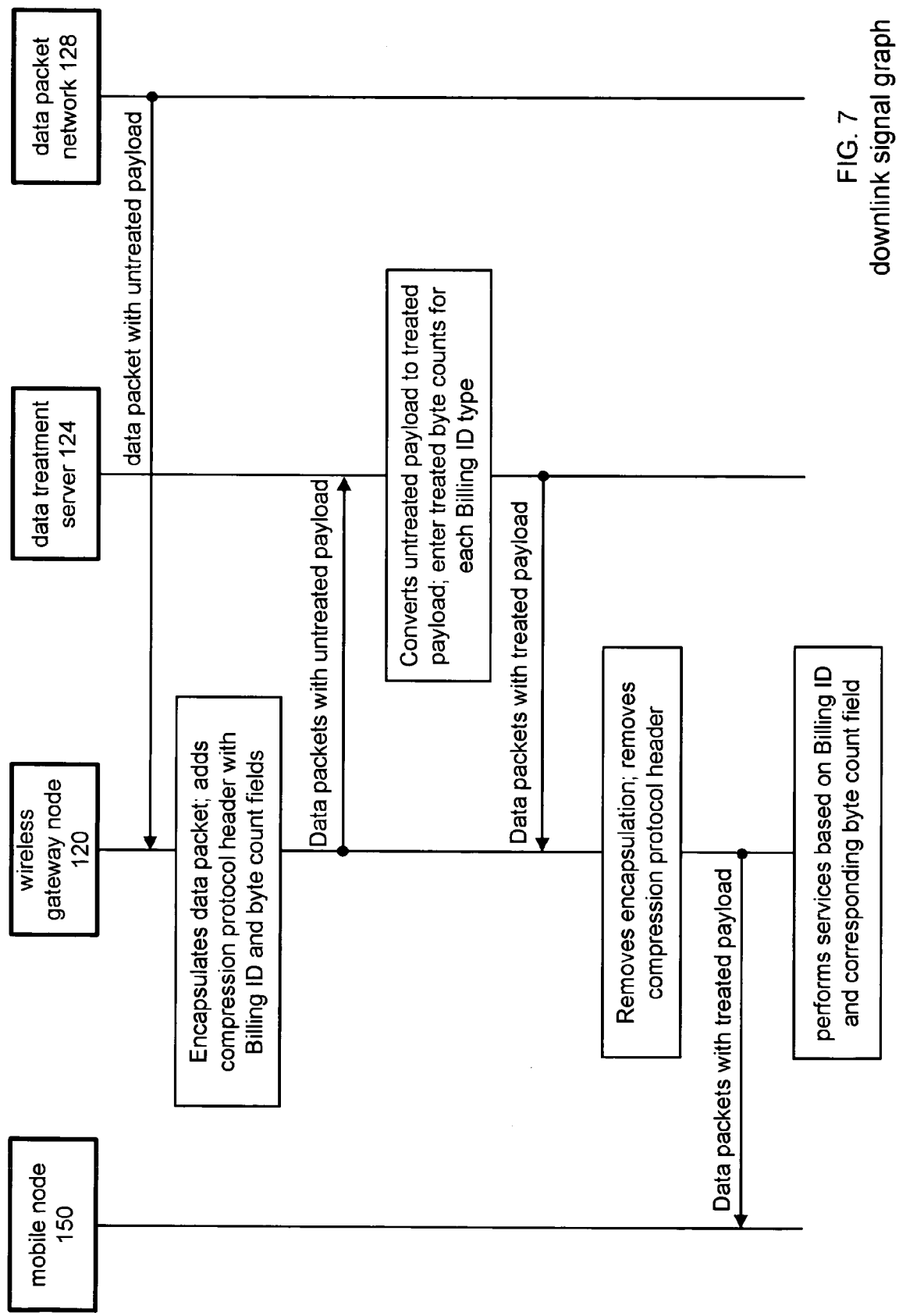
FIG. 7 is a downlink signal graph according to one embodiment of the present invention.

FIG. 7 is a downlink signal graph according to one embodiment of the present invention. Wireless gateway node 120 receives a data packet with an untreated payload from data packet network 128. Wireless gateway node 120 inspects and classifies the content of the data packet payload then encapsulates the data packet and the untreated payload using Generic Routing Encapsulation (GRE) then adds a compression protocol header having billing ID and byte count fields, among others. Based on the inspection and classification, wireless gateway node 120 fills the billing ID field based on the inspected content. Thereafter, wireless gateway node 120 routes the data packet with the untreated payload to data treatment server 124. Data treatment server 124 converts the untreated payload to a treated payload and adds the treated payload byte count to the byte count field corresponding to the billing ID. Data treatment server 124 then routes the data packet with the treated payload back to wireless gateway node 120. Wireless gateway node 120 removes the compression protocol header and removes the encapsulation. The data packet with the treated payload is then routed to mobile node 150. Thereafter, wireless gateway node 120 performs mobile node services based on the billing ID and the corresponding byte counts.

Figure 8:
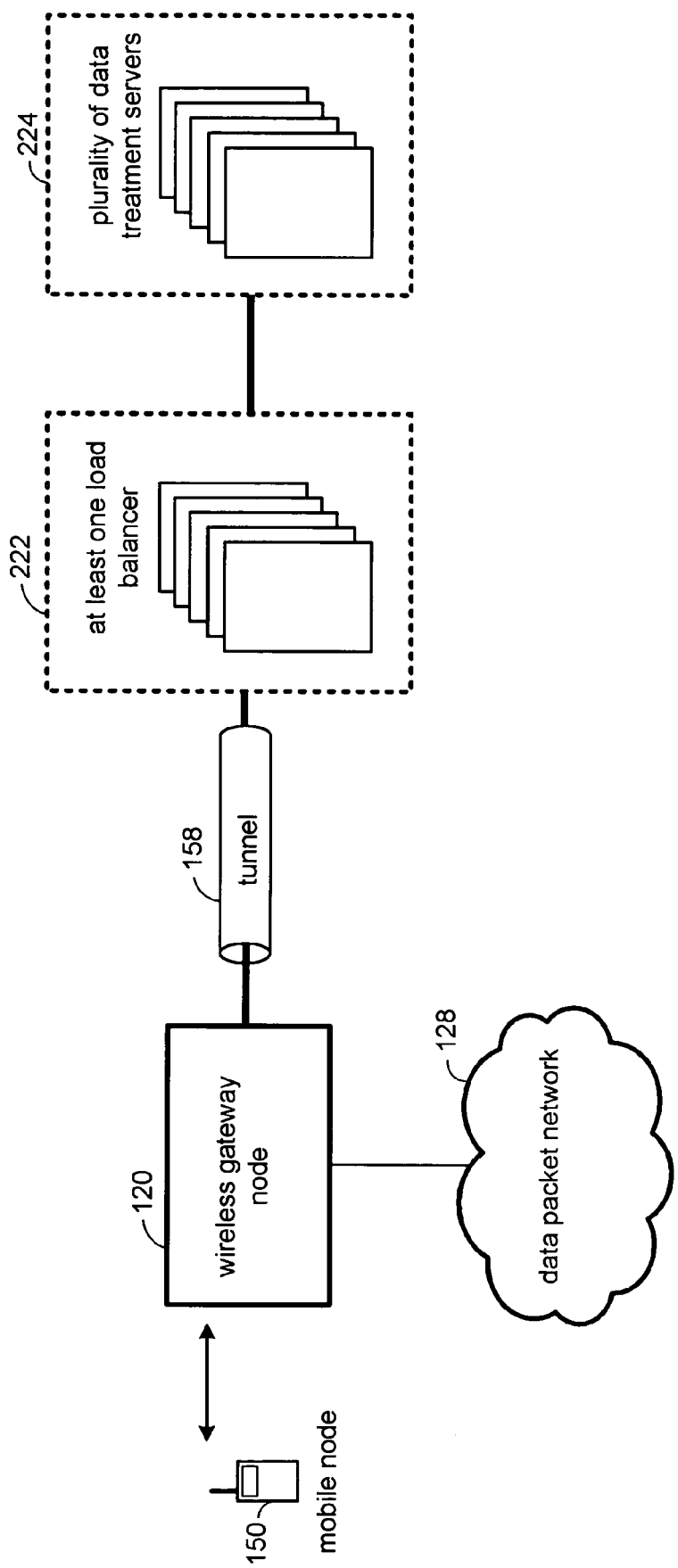
FIG. 8 is a schematic block diagram of an alternate embodiment of the present invention.

FIG. 8 is a schematic block diagram of an alternate embodiment of the present invention. In this embodiment, an optional at least one load balancer 222 is the end point of tunnel 158. When wireless gateway node 120 encapsulates the data packet using GRE then adds the compression protocol header, the address of the at least one load balancer 222 is the destination address. The at least one load balancer 222 routes data packets to one of a plurality of data treatment servers 224 based on the load conditions to treat and un-treat the data packets. The routing of data packets for the uplink and downlink are as previously described.

Figure 9:
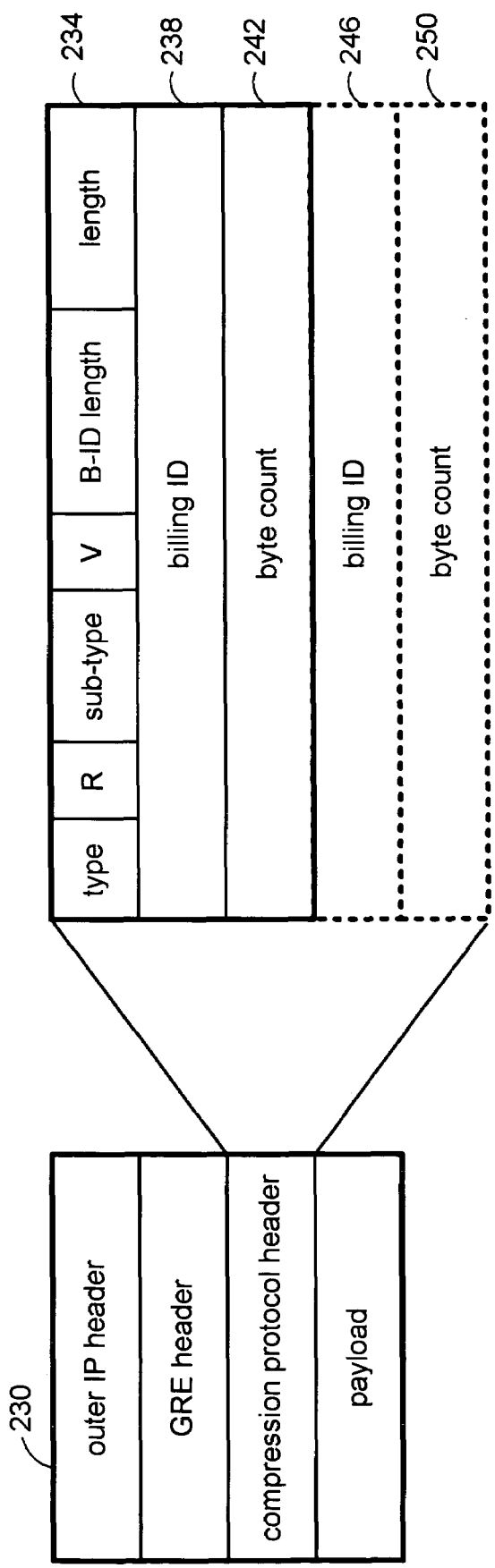
FIG. 9 illustrates the compression protocol header in accordance with the present invention.

FIG. 9 illustrates the compression protocol header in accordance with the present invention. When the data packet is encapsulated by one of the data treatment server, the load balancer, or the data treatment server, the compression protocol header is added to the GRE header. As can be seen in FIG. 9, GRE header 230 includes an outer IP header, a GRE header, a compression protocol header, and a payload. As can be further seen in FIG. 9, the compression protocol header includes a number of additional fields 234-250.

Field 234 includes a three-bit Type field, a three-bit Reserved (R) field, a six-bit Sub-Type field, a four-bit Version (V) field, an eight-bit Billing ID Length field, and an eight-bit Length field. The Type field contains information on the protocol used. The Reserved (R) field is reserved for further uses while the Sub-Type field defines the direction of data flow as either ingress (uplink) or egress (downlink). The Version field (V) is initially set to zero with other values reserved for future use. The Billing ID Length field defines the length of the subsequent billing ID fields. The Length field defines the length of the compression protocol header excluding the Type, Reserved, Sub-Type, Version, B-ID Length, and the Length fields.

A Billing ID field 238 is a variable length field set by the wireless gateway node based on the results of the data packet inspection and classification. Byte Count field 242 contains the byte count of the treated payload corresponding to Billing ID field 238. Multiple optional Billing ID field 246 and Byte Count 250 are included if the results of the data packet inspection and classification produce more than one type of content in the data packet payload. Although not shown in FIG. 9, a padding field may be added to the compression protocol header to bring the total header length to an even multiple of four bytes.

Figure 10:
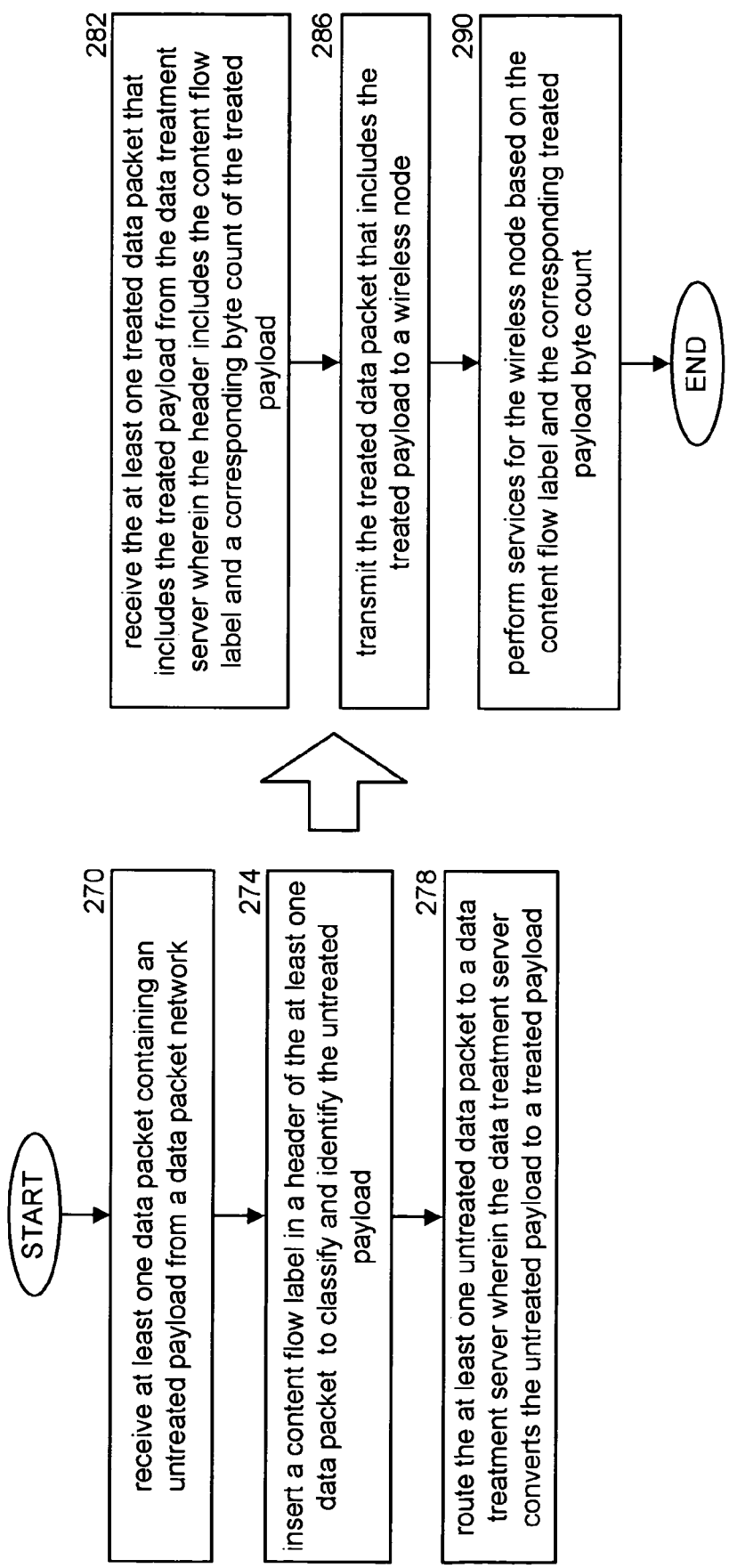
FIG. 10 is a flow chart of a method in accordance with an embodiment of the present invention.

FIG. 10 is a flow chart of a method in accordance with an embodiment of the present invention. In a wireless gateway node, the method includes initially receiving at least one data packet containing an untreated payload from a data packet network (step 270). Based on the inspection and classification of the data packet payload, the method includes inserting a content flow label in a header of the at least one data packet to classify and identify the untreated payload (step 274) then routing the at least one data packet with the untreated payload to a data treatment server wherein the data treatment server converts the untreated payload to a treated payload (step 278).

In a wireless gateway node, the method includes receiving the at least one data packet that includes the treated payload from the data treatment server wherein the header includes the content flow label and a corresponding byte count of the treated payload (step 282). Thereafter, the method includes transmitting the data packet that includes the treated payload to a wireless node (step 286). Thereafter, the inventive method includes performing services for the wireless node based on the content flow label and the corresponding treated payload byte count (step 290).

Figure 11:
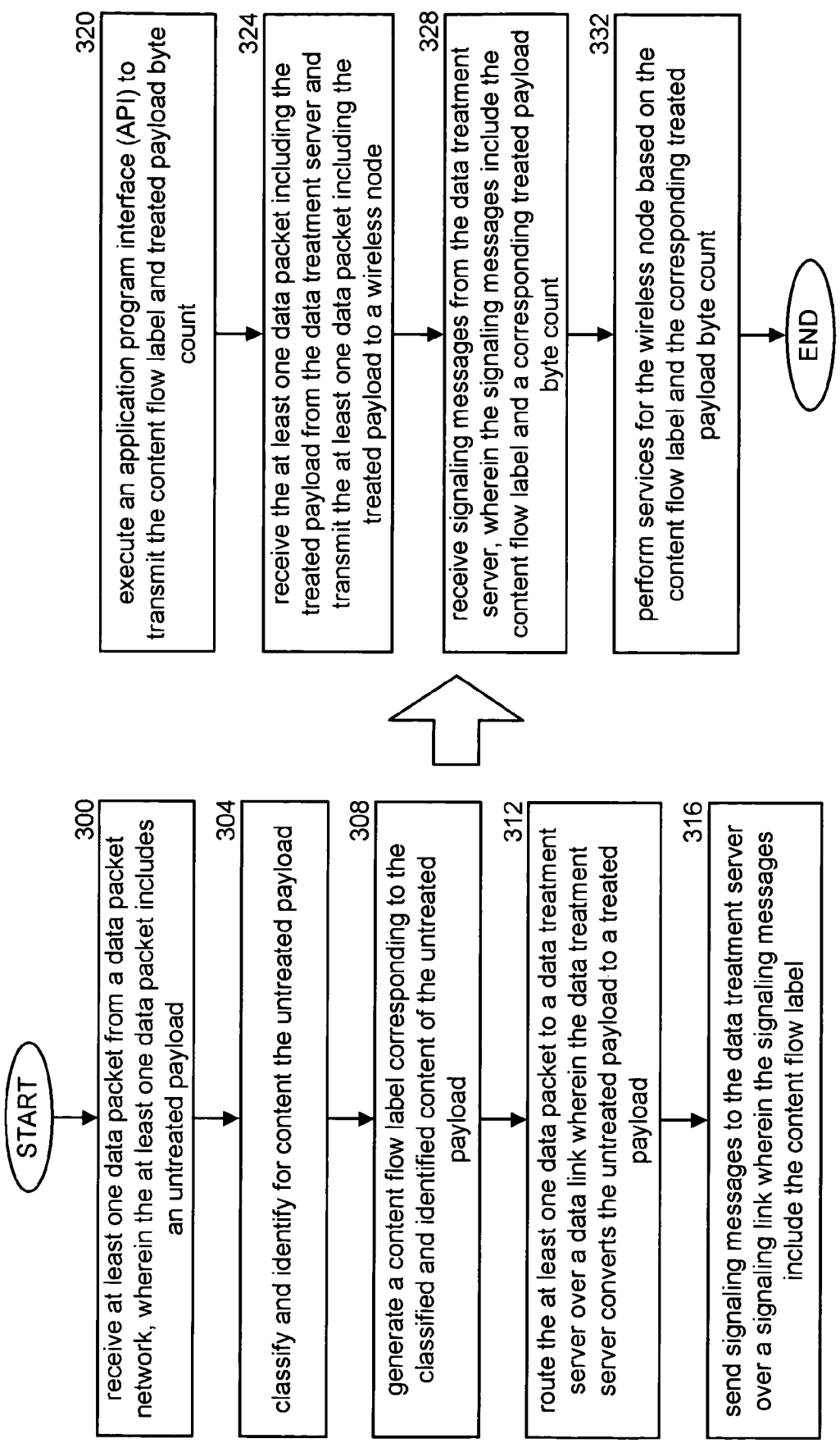
FIG. 11 is a flow chart of a method according to an embodiment of the present invention.

FIG. 11 is a flow chart of a method according to an embodiment of the present invention. In a wireless gateway node, the embodiment of the inventive method includes receiving at least one data packet from a data packet network, wherein the at least one data packet includes an untreated payload (step 300). In order to provide services to the mobile node, the next step includes inspecting the data packet payload to classify and identify for content the untreated payload (step 304). Based on the results of the inspection, the wireless gateway node generates a content flow label corresponding to the classified and identified content of the untreated payload (step 308). The wireless gateway node then routes the at least one data packet to a data treatment server over a data link wherein the data treatment server converts the untreated payload to a treated payload (step 312).

Thereafter, the embodiment of the inventive method includes transmitting signaling messages to the data treatment server over a signaling link wherein the signaling messages include the content flow label (step 316). The signaling link may be over one of an SS7 network, an ATM network, or an IP network. Thereafter, the wireless gateway node executes an application program interface (API) to transmit the content flow label and treated payload byte count (step 320).

The wireless gateway node then receives the at least one data packet including the treated payload from the data treatment server and transmit the at least one data packet including the treated payload to a wireless node (step 324). A next step includes receiving signaling messages from the data treatment server, wherein the signaling messages include the content flow label and a corresponding treated payload byte count (step 328). Thereafter, the wireless gateway node performs services for the wireless node based on the content flow label and the corresponding treated payload byte count (step 332).

Figure 12:
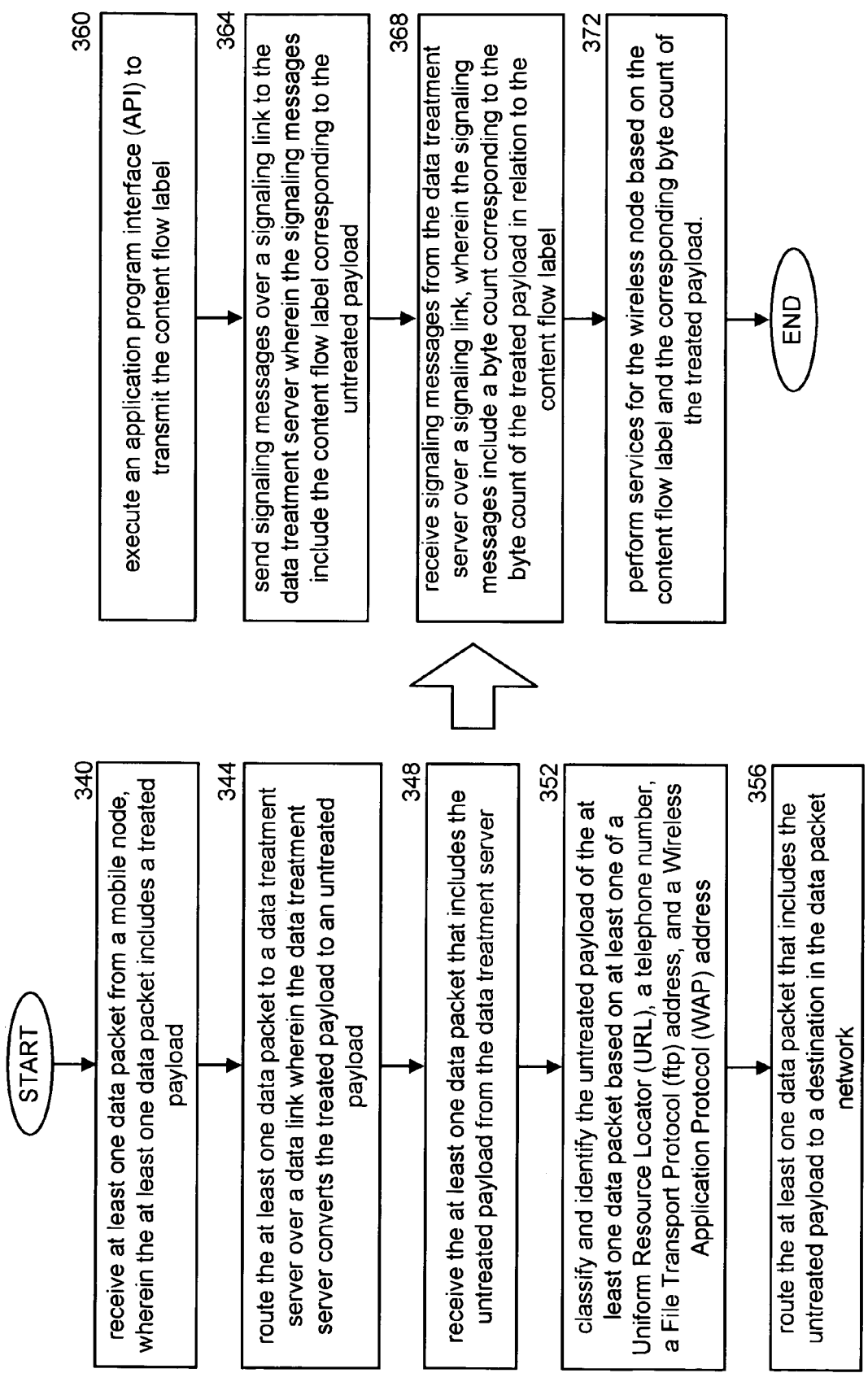
FIG. 12 is a flow chart of a method in accordance with an embodiment of the present invention.

FIG. 12 is a flow chart of a method in accordance with an embodiment of the present invention. According to this embodiment, a wireless gateway node receives at least one data packet from a mobile node, wherein the at least one data packet includes a treated payload (step 340). Due to the treatment (optimization and/or compression) of the payload, the wireless gateway node is unable to inspect the payload for content. The wireless gateway node will, therefore, route the at least one data packet to a data treatment server over a data link wherein the data treatment server converts the treated payload to an untreated payload (step 344). Following the data treatment, the data treatment server returns the at least one data packet with the untreated payload to the wireless gateway node. Thereafter, the wireless gateway node receives the at least one data packet that includes the untreated payload from the data treatment server (step 348). In order to provide services, the wireless gateway node will inspect the payload to classify and identify the untreated payload of the at least one data packet based on at least one of a URL, a telephone number, a File Transport Protocol (ftp) address, and a WAP address (step 352). Following the inspection and classification step, the wireless gateway node routes the at least one data packet that includes the untreated payload to a destination in the data packet network (step 356). In order to exchange the content flow label and byte count information, the wireless gateway node executes an application program interface (API) to transmit the content flow label (step 360). The API sends signaling messages over a signaling link to the data treatment server wherein the signaling messages include the content flow label corresponding to the untreated payload (step 364). In response to the signaling messages, the data treatment server determines the transmitted treated byte count for each content flow label and returns the data to the wireless gateway node over the signaling link. The wireless gateway node receives the signaling messages from the data treatment server over the signaling link, wherein the signaling messages include the byte count corresponding to the byte count of the treated payload in relation to the content flow label (step 368). Thereafter, the wireless gateway node performs services for the wireless node based on the content flow label and the corresponding byte count of the treated payload (step 372).

Figure 13:
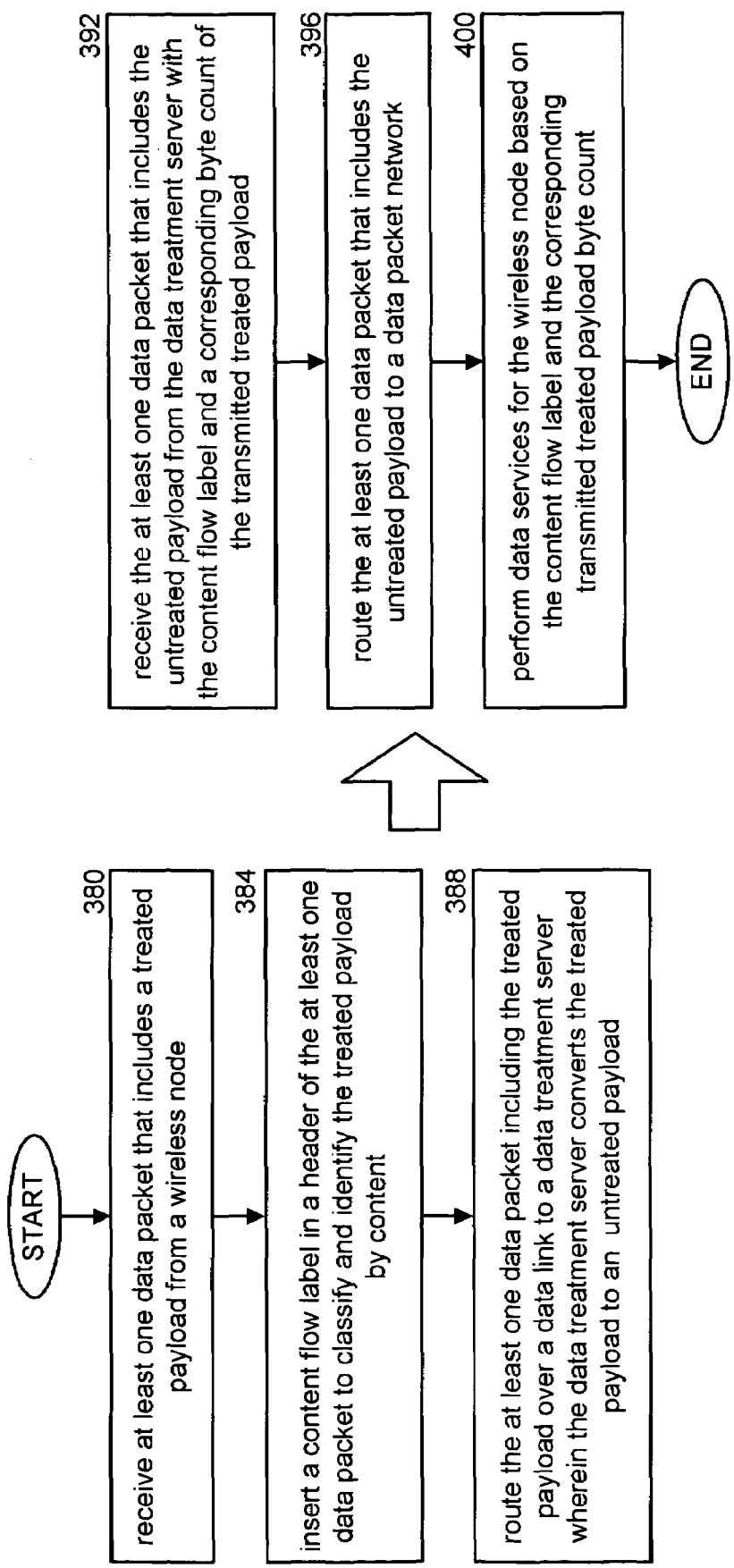
FIG. 13 is a flow chart of a method in accordance with an embodiment of the present invention.

FIG. 13 is a flow chart of a method in accordance with an embodiment of the present invention. In this embodiment, a wireless gateway node receives at least one data packet that includes a treated payload from a wireless node (step 380) and inserts a content flow label in a header of the at least one data packet to classify and identify the treated payload by content (step 384). Following the classification and identification, the wireless gateway node routes the at least one data packet including the treated payload over a data link to a data treatment server wherein the data treatment server converts the treated payload to an untreated payload (step 388). After the conversion, the data treatment server then determines a transmitted treated byte count for each content flow label assigned by the wireless gateway node then returns the at least one data packet to the wireless gateway node. The wireless gateway node receives the at least one data packet that includes the untreated payload from the data treatment server with the content flow label and a corresponding byte count of the transmitted treated payload (step 392). Thereafter, the wireless gateway node routes the at least one data packet including the untreated payload to a data packet network (step 396), and performs data services for the wireless node based on the content flow label and the corresponding transmitted treated payload byte count (step 400).

Figure 14:
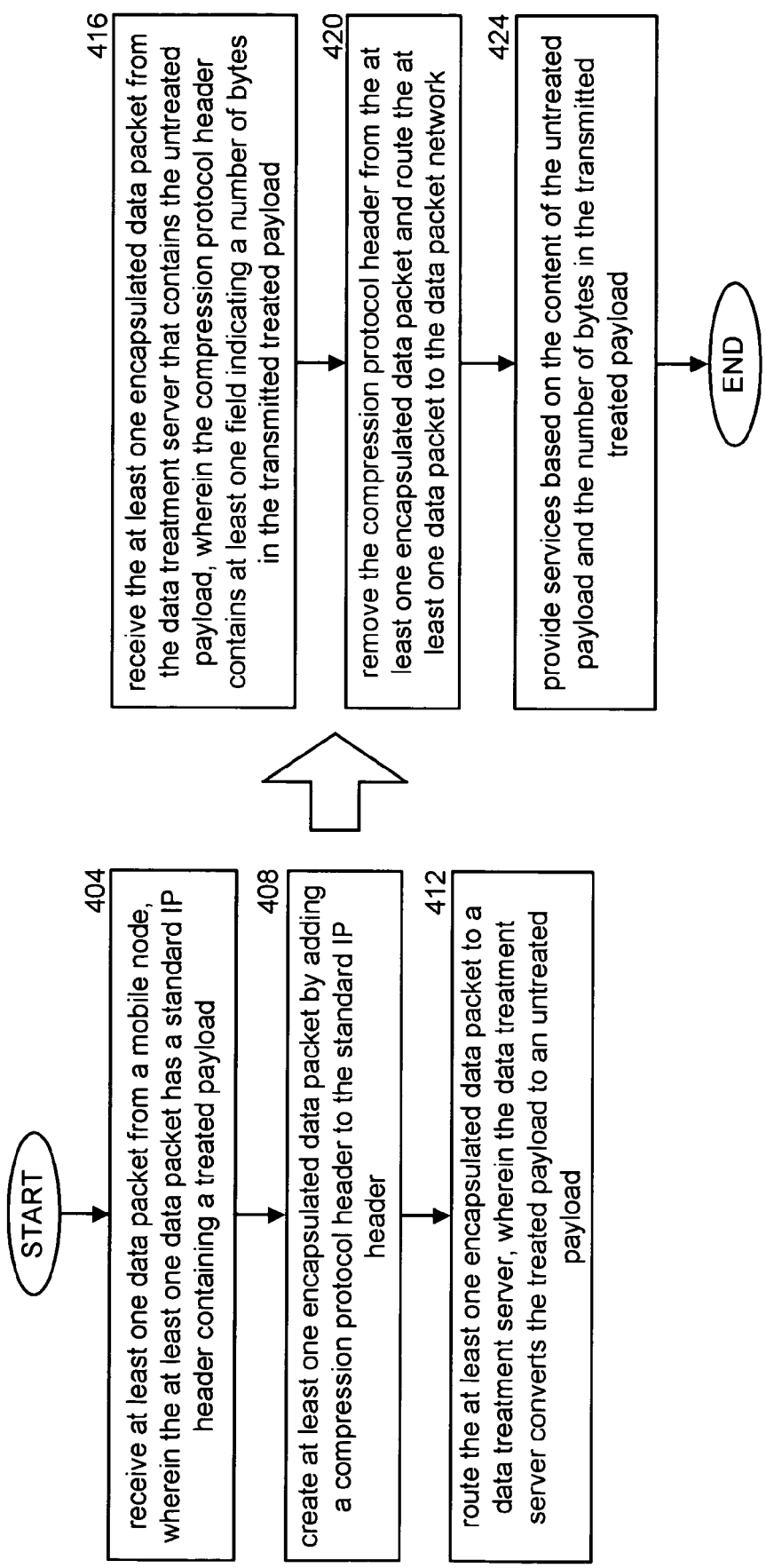
FIG. 14 is a flow chart of a method in accordance with an embodiment of the present invention.

FIG. 14 is a flow chart of a method in accordance with an embodiment of the present invention. A wireless gateway node receives at least one data packet from a mobile node, wherein the at least one data packet has a standard IP header containing a treated payload (step 404). The wireless gateway node cannot inspect the treated payload and is, therefore, unable to provide mobile node services based on the content of the payload. In order to receive information regarding the treated payload, the wireless gateway node creates a compression protocol header that includes, in this embodiment of the invention, a content billing ID field and a byte count field, among others. The wireless gateway node creates at least one encapsulated data packet by adding the compression protocol header to the standard IP header (step 408), wherein the encapsulation adds a GRE header to the standard IP header. Following the encapsulation of the at least one data packet, the wireless gateway node routes the at least one encapsulated data packet to a data treatment server, wherein the data treatment server converts the treated payload to an untreated payload (step 412). After payload treatment, the data treatment server inserts byte counts into the byte count fields corresponding to the transmitted treated payload byte counts. Once the payload is converted to an untreated payload, the wireless gateway node will be able to inspect the payload for content. The wireless gateway node receives the at least one encapsulated data packet from the data treatment server that contains the untreated payload, wherein the compression protocol header contains at least one field indicating the number of bytes in the transmitted treated payload (step 416). Before the wireless gateway node routes the data packet to the data packet network, it removes the GRE header and removes the compression protocol header from the at least one encapsulated data packet and routes the at least one data packet to the data packet network (step 420). Based on the contents of the billing ID field and the number of transmitted treated payload bytes indicated in the byte count field, the wireless gateway node provides services based on the content of the untreated payload and the number of bytes in the transmitted treated payload (step 424). The services provided may include one of content based billing, pre-paid wireless, and content based routing.

Figure 15:
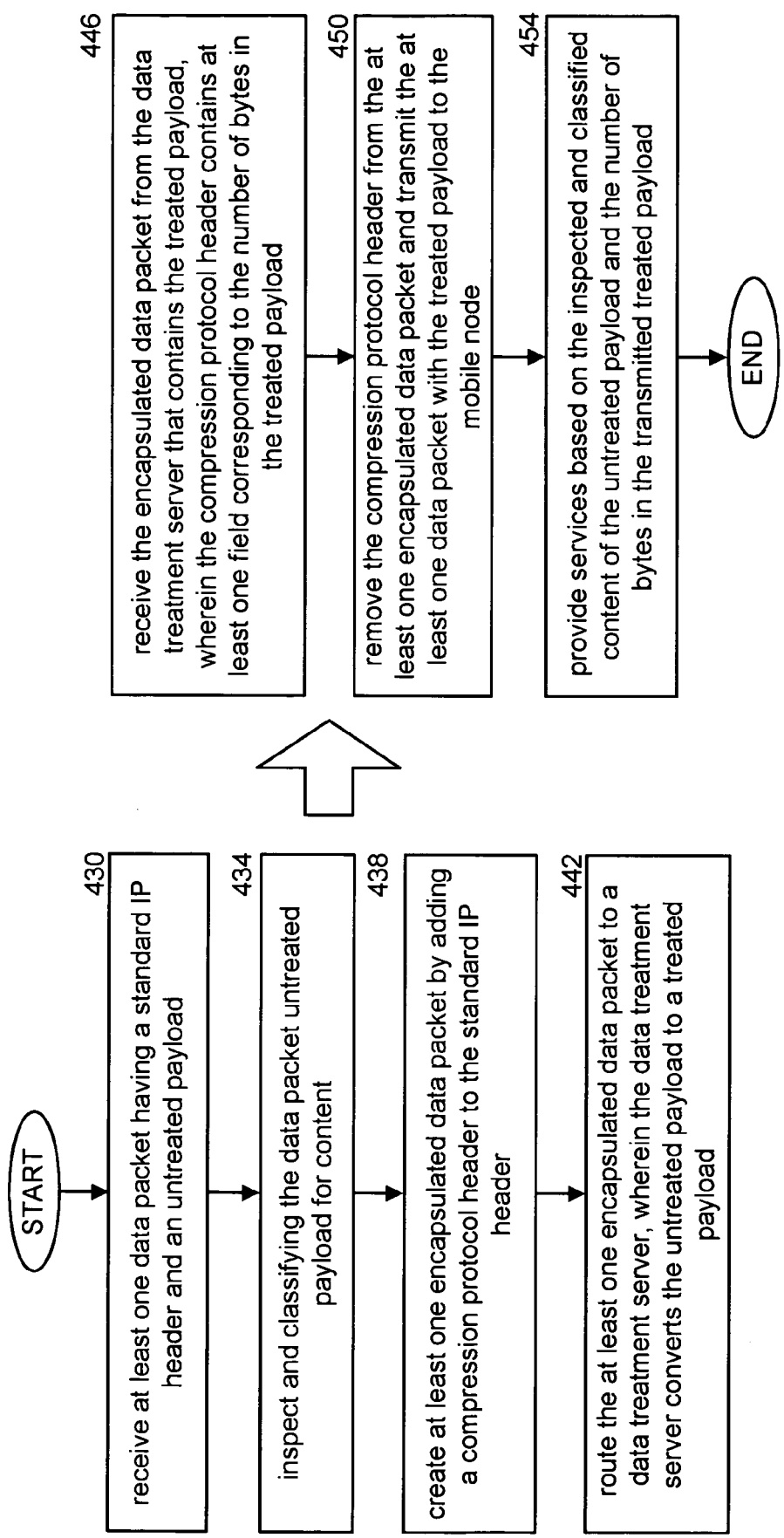
FIG. 15 is a flow chart of a method in accordance with an embodiment of the present invention.

FIG. 15 is a flow chart of a method in accordance with an embodiment of the present invention. In a wireless gateway node, receive at least one data packet having a standard IP header and an untreated payload (step 430) from a data packet network. Because the payload is untreated, the wireless gateway node can inspect and classify the data packet untreated payload for content (step 434). Each content type in the payload is assigned a content billing ID field based on a rate bucket corresponding to the content type. There may be multiple content types in a data packet. The wireless gateway node creates at least one encapsulated data packet by adding a compression protocol header to the standard IP header (step 438) then adds a GRE header to complete the encapsulation. Thereafter, the wireless gateway node routes the at least one encapsulated data packet to a data treatment server, wherein the data treatment server converts the untreated payload to a treated payload (step 442). The services provided by the wireless gateway node are based, in part, on the number of treated payload bytes transmitted between the wireless gateway node and the wireless node. Thus, the wireless gateway node receives the encapsulated data packet from the data treatment server that contains the treated payload, wherein the compression protocol header contains at least one field corresponding to the number of bytes in the treated payload (step 446). Prior to transmitting the data packet with the treated payload, the wireless gateway node will remove the encapsulation and remove the compression protocol header from the at least one encapsulated data packet and transmit the at least one data packet with the treated payload to the mobile node (step 450). The wireless gateway node then provides services based on the inspected and classified content of the untreated payload and the number of bytes in the transmitted treated payload (step 454).

Figure 16:
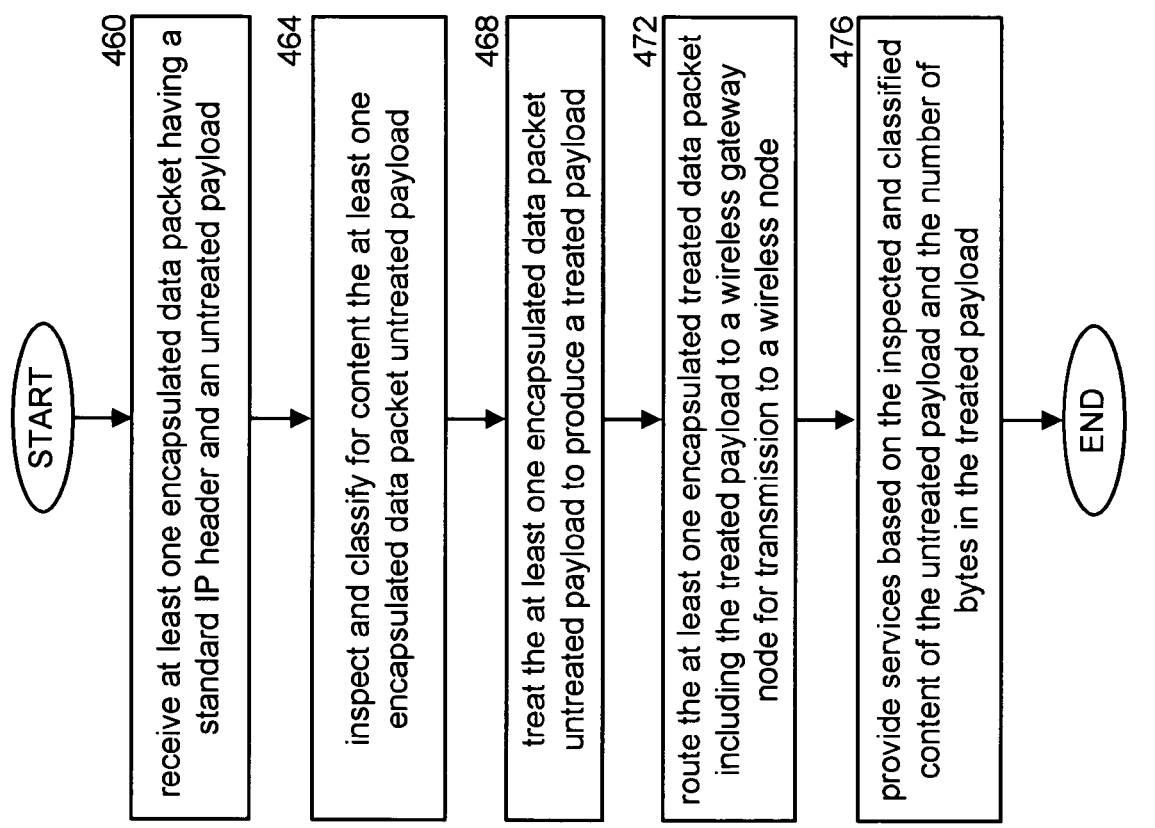
FIG. 16 is a flow chart of a method in accordance with an embodiment of the present invention.

FIG. 16 is a flow chart of a method in accordance with an embodiment of the present invention. A data treatment server, in this embodiment of the invention, provides services to a mobile node. The data treatment server receives at least one encapsulated data packet having a standard IP header and an untreated payload (step 460), wherein the encapsulation uses the GRE protocol. The data treatment server inspects and classifies for content the at least one encapsulated data packet untreated payload (step 464). According to a defined algorithm for optimization or compression, the data treatment server treats the at least one encapsulated data packet untreated payload to produce a treated payload (step 468). Thereafter, the data treatment server forwards the at least one encapsulated treated data packet including the treated payload to a wireless gateway node for transmission to a wireless node (step 472). Based on the results of the inspection and classification, the data treatment server provides services based on the inspected and classified content of the untreated payload and the number of bytes in the treated payload (step 476). Thus, the mobile node will be charged for services, such as one of content based billing, pre-paid wireless, and content based routing based on the number of treated bytes transmitted between the mobile node and the wireless gateway node.

Figure 17:
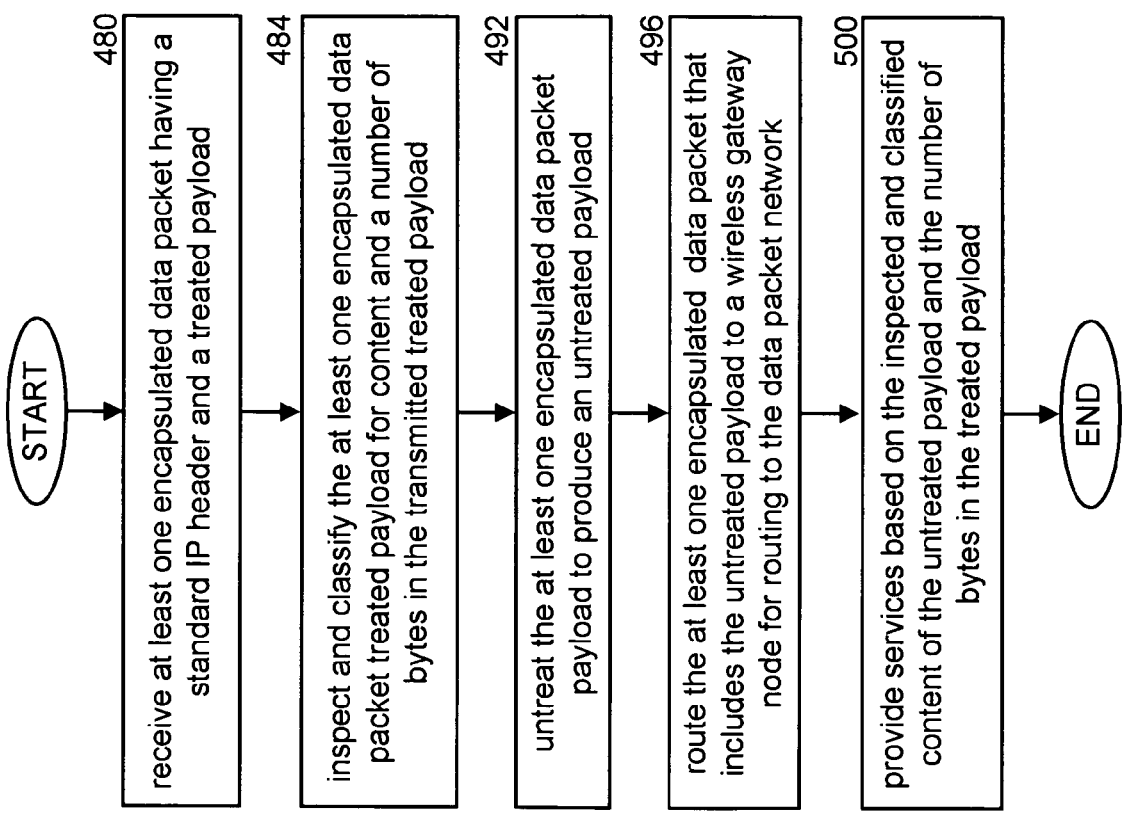
FIG. 17 is a flow chart of a method in accordance with an embodiment of the present invention.

FIG. 17 is a flow chart of a method in accordance with an embodiment of the present invention. According to this embodiment of the present invention, a data treatment server provides services to a mobile node. The data treatment server receives at least one encapsulated data packet having a standard IP header and a treated payload (step 480), wherein the encapsulation is based on the GRE protocol. The data treatment server will inspect and classify the at least one encapsulated data packet treated payload for content and a number of bytes in the transmitted treated payload (step 484). Thereafter, the data treatment server will untreat the at least one encapsulated data packet payload to produce an untreated payload (step 492). Thereafter, the data treatment server routes the at least one encapsulated data packet that includes the untreated payload to a wireless gateway node for routing to the data packet network (step 496). The data treatment server then provides services based on the inspected and classified content of the untreated payload and the number of bytes in the treated payload (step 500).

As one of average skill in the art will appreciate, the term "substantially" or "approximately", as may be used herein, provides an industry-accepted tolerance to its corresponding term. Such an industry-accepted tolerance ranges from less than one percent to twenty percent and corresponds to, but is not limited to, component values, integrated circuit process variations, temperature variations, rise and fall times, and/or thermal noise. As one of average skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of average skill in the art will also appreciate, inferred coupling (i.e., where one element is coupled to another element by inference) includes direct and indirect coupling between two elements in the same manner as "operably coupled". As one of average skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The invention disclosed herein is susceptible to various modifications and alternative forms. Specific embodiments therefore have been shown by way of example in the drawings and detailed description. It should be understood, however, that the drawings and detailed description thereto are not intended to limit the invention to the particular form disclosed, but on the contrary, the invention is to cover all modifications, equivalents and alternatives falling within the spirit and scope of the present invention as defined by the claims.

What is claimed is:

1. A method in a wireless gateway node for providing services in a wireless network, the method comprising:
   receiving at least one data packet from a mobile node, wherein the at least one data packet has a standard Internet Protocol (IP) header containing a treated payload;
   creating at least one encapsulated data packet by adding a compression protocol header to the standard IP header;
   routing the at least one encapsulated data packet to a data treatment server, wherein the data treatment server converts the treated payload to an untreated payload;
   receiving the at least one encapsulated data packet from the data treatment server that contains the untreated payload, wherein the compression protocol header contains at least one field indicating a number of bytes in the treated payload;
   removing the compression protocol header from the at least one encapsulated data packet and routing the at least one data packet to a data packet network; and
   providing services based on the content of the untreated payload and the number of bytes in the treated payload.

2. The method of claim 1 wherein the services include at least one of content based billing, pre-paid wireless, and content based routing.

3. The method of claim 1 wherein the at least one data packet is encapsulated using Generic Routing Encapsulation (GRE).

4. The method of claim 1 wherein the wireless network comprises at least one of a Universal Mobile Telecommunications System (UMTS) and a General Packet Radio Service (GPRS) network.

5. The method of claim 1 wherein the data treatment server comprises at least one of a Traffic Protocol Optimizer (TPO) and a load balancer.

6. The method of claim 1 wherein the compression protocol header comprises at least one of:
   a type field;
   a reserved field;
   a sub-type field defining the direction of data flow as either ingress or egress;
   a version field;
   a billing ID length field defining the length of a billing ID field;
   a length field defining the number of bytes used in the billing ID fields and byte count fields;
   at least one billing ID field defining an accounting ID used for network services that is based on the content of the data packet;
   a byte count field for each billing ID field defining the number of bytes transmitted; and
   a padding field of variable length to set the compression protocol header length to an even multiple of four bytes.

7. A method in a wireless gateway node for providing services in a wireless data packet network, the method comprising:
   receiving at least one data packet having a standard Internet Protocol (IP) header and an untreated payload;
   inspecting and classifying the data packet untreated payload for content;
   creating at least one encapsulated data packet by adding a compression protocol header to the standard IP header;
   routing the at least one encapsulated data packet to a data treatment server, wherein the data treatment server converts the untreated payload to a treated payload;
   receiving the encapsulated data packet from the data treatment server that contains the treated payload, wherein the compression protocol header contains at least one field corresponding to the number of bytes in the treated payload;
   removing the compression protocol header from the at least one encapsulated data packet and transmitting the at least one data packet with the treated payload to the mobile node; and
   providing services based on the inspected and classified content of the untreated payload and the number of bytes in the treated payload.

8. The method of claim 7 wherein the services include at least one of content based billing, pre-paid wireless, and content based routing.

9. The method of claim 7 wherein the data packet is encapsulated using Generic Routing Encapsulation (GRE).

10. The method of claim 7 wherein the wireless network comprises at least one of a Universal Mobile Telecommunications System (UMTS) and a General Packet Radio Service (GPRS) network.

11. The method of claim 7 wherein the data treatment server comprises at least one of a Traffic Protocol Optimizer (TPO) and a load balancer.

12. The method of claim 7 wherein the compression protocol header comprises at least one of:
   a type field;
   a reserved field;
   a sub-type field defining the direction of data flow as either ingress or egress;
   a version field;
   a billing ID length field defining the length of a billing ID field;
   a length field defining the number of bytes used in the billing ID fields and byte count fields;
   at least one billing ID field defining an accounting ID used for network services that is based on the content of the data packet;
   a byte count field for each billing ID field defining the number of bytes transmitted; and
   a padding field of variable length to set the header length to an even multiple of four bytes.

* * * * *